(12) United States Patent
Hilfrich et al.

(10) Patent No.: US 11,031,649 B2
(45) Date of Patent: Jun. 8, 2021

(54) HOUSING FOR A VEHICLE BATTERY, AND METHOD FOR MANUFACTURING A HOUSING OF SAID TYPE

(71) Applicants: Thyssenkrupp Steel Europe AG, Duisburg (DE); Thyssenkrupp AG, Essen (DE)

(72) Inventors: Erik Hilfrich, Düsseldorf (DE); Andreas Breidenbach, Brühl (DE)

(73) Assignees: thyssenKrupp Steel Europe AG, Duisburg (DE); thyssenKrupp AG, Essen (DE)

(*) Notice: Subject to any disclaimer, the term of this patent is extended or adjusted under 35 U.S.C. 154(b) by 119 days.

(21) Appl. No.: 16/306,781

(22) PCT Filed: May 29, 2017

(86) PCT No.: PCT/EP2017/062922
§ 371 (c)(1),
(2) Date: Dec. 3, 2018

(87) PCT Pub. No.: WO2017/207503
PCT Pub. Date: Dec. 7, 2017

(65) Prior Publication Data
US 2019/0131602 A1 May 2, 2019

(30) Foreign Application Priority Data
Jun. 3, 2016 (DE) ..................... 10 2016 110 330.6

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 6,085,854 | A | 7/2000 | Nishikawa |
| 2010/0307848 | A1 | 12/2010 | Hashimoto et al. |
| 2011/0143179 | A1 | 6/2011 | Nakamori |
| 2013/0273398 | A1 | 10/2013 | Hoshi et al. |
| 2014/0030563 | A1 | 1/2014 | Hoshi et al. |

(Continued)

FOREIGN PATENT DOCUMENTS

| | | |
|---|---|---|
| CN | 202712300 U | 1/2013 |
| CN | 103456907 A | 12/2013 |
| CN | 203553239 U | 4/2014 |

(Continued)

OTHER PUBLICATIONS

PCT Application No. PCT/EP2017/062922, International Search Report, dated Jul. 28, 2017, 3 pages.

(Continued)

*Primary Examiner* — Wyatt P McConnell
(74) *Attorney, Agent, or Firm* — Avant Law Group, LLC (57) ABSTRACT

A housing for a vehicle battery has a cover plate and a bottom plate, and a frame arranged between the cover plate and the bottom plate. The frame is connected to the cover plate and the bottom plate, and at least one crossmember element is arranged in the space which is enclosed by the frame.

20 Claims, 6 Drawing Sheets

(56) References Cited

U.S. PATENT DOCUMENTS

2014/0093765 A1    4/2014  Kusunoki
2014/0170447 A1*   6/2014  Woehrle ............ H01M 10/4207
                                                            429/61

FOREIGN PATENT DOCUMENTS

| | | |
|---|---|---|
| CN | 204029878 U | 12/2014 |
| CN | 204651375 U | 9/2015 |
| CN | 205122658 U | 3/2016 |
| DE | 102009043635 A1 | 4/2011 |
| DE | 102010020065 A1 | 11/2011 |
| DE | 102010050826 A1 | 5/2012 |
| DE | 102009006991 B4 | 8/2013 |
| DE | 102012102938 A1 | 10/2013 |
| DE | 102012015817 A1 | 2/2014 |
| DE | 102013021597 A1 | 7/2014 |
| FR | 2961443 A1 | 12/2011 |

OTHER PUBLICATIONS

DE Application No. 102016110330.6, First Office Action, dated Jan. 27, 2017, 12 pages.
Ping Hu et.al., Front Crash Simulation and Design Improvement of a pure electric Vehicle, dated 2011.
Outokumpu and Fraunhofer Institute develop lightweight stainless steel battery pack for EVs; up to 20% weight reduction—Green Car Congress, dated Apr. 19, 2016.
Search Report, dated Oct. 25, 2020, 3 pages, issued in Chinese Application No. 2017800343499.

* cited by examiner

HOUSING FOR A VEHICLE BATTERY, AND METHOD FOR MANUFACTURING A HOUSING OF SAID TYPE

CROSS-REFERENCE TO RELATED APPLICATIONS

This application is the U.S. national phase of, and claims priority to, International Application No. PCT/EP2017/062922, filed May 29, 2017, which designated the U.S. and which claims priority to German Patent Application No. 10 2016 110 330.6, filed Jun. 2, 2016. These applications are each incorporated by reference herein in their entireties.

BACKGROUND

Housings for vehicle batteries are generally known. There are a wide variety of requirements for housings of this type; for instance, they have to support the weight of the battery cells which are usually combined in modules, they have to make fastening to the vehicle body possible, they have to protect the battery against damage in the case of an accident or other vehicle damage, they have to be watertight but at the same time make attachments for electric connectors and heating and cooling of the battery possible, they have to conduct gases out of the housing, possibly via a pressure relief valve, and they have to be as maintenance-free as possible during the service life of the battery, and make dismantling of the battery possible in the case of a repair.

In order to comply with said requirements, the known housings are of complex construction, are expensive to manufacture and have a high weight.

Since the requirements of the range of the batteries are rising, the batteries will additionally continually take up more installation space, which entails increased requirements of the stability and further increases the weight. Batteries with a capacity of greater than 20 kWh and a weight of more than 200 kg are thus required for an extensive electromobility with relatively high ranges of the electric vehicles, as demanded by politicians.

SUMMARY OF THE INVENTION

It is therefore one object of the present invention to provide a housing for a battery, which housing can be manufactured economically, is favorable in terms of installation space, is light, is watertight, can be dismantled, and has high crash safety.

Said object may be achieved by way of a housing for a vehicle battery, having a cover plate and a bottom plate, a frame being arranged between the cover plate and the bottom plate, the frame being connected to the cover plate and the bottom plate, at least one crossmember element being arranged in the space which is enclosed by the frame.

In comparison with the prior art, the housing according to the invention has the advantage that the housing can be assembled and dismantled in a simple way, takes up a small amount of installation space, is watertight and at the same time has a high stability, in particular in the case of a crash, and a low weight. The housing is preferably provided for use in electric vehicles, in particular in pure electric vehicles (battery electric vehicle, BEV), electric vehicles with range extenders (range extended electric vehicle, REEV), plug-in hybrid vehicles (PHEV) and/or hybrid vehicles (HEV). The present invention advantageously provides a modular battery housing which can be integrated into different vehicle bodies. The frame may be configured as a single-piece or multiple-piece rolled profile and/or canted part, in particular as a C-profile. The frame may have a profile with a variable cross section. The frame may have a strength of at least 400 MPa; in particular, the frame is manufactured from a steel with a strength of at least 400 MPa. A person skilled in the art understands that strength means, in particular, the tensile strength. As a result, it is advantageously possible to provide a stable frame which can be manufactured in a simple way, and it being possible for the size of the battery housing to be scaled in a simple way via the length. In one embodiment, it is provided that the frame is of substantially rectangular configuration, the frame being at least partially curved at the corners. As a result, the stability of the frame can be increased further in a particularly advantageous way. Furthermore, it is provided that the crossmember element may be configured as a rolled profile and/or as a canted part; here, the crossmember element may have a substantially rectangular and/or cap-shaped cross section. The crossmember element may be manufactured from a relatively high strength metallic metal sheet, in particular a relatively high strength steel, with a strength of at least 400 MPa. A person skilled in the art understands that a plurality of crossmembers can be provided depending on the size of the battery housing, which crossmembers form a plurality of cells for receiving battery modules, in particular together with the frame, the cover plate and the bottom plate. It is provided in accordance with one embodiment that the bottom plate and/or the cover plate are/is manufactured from a metallic plate. The cover plate may be manufactured from metal, in particular from steel and/or aluminum, a metal/plastic sandwich material, in particular a steel/plastic and/or aluminum/plastic sandwich material. The bottom plate is may be manufactured from a high strength metallic material with a strength of at least 780 MPa, in particular from ultra high strength steel. In particular, hardened manganese-boron alloyed steel or a hardened steel multiple-layer sandwich material is suitable as an ultra high strength steel, for example. In embodiments, the bottom plate and/or the cover plate have/has elevations and/or depressions in order to increase the rigidity. In particular, the elevations and/or depressions are configured as beads. As a result, a battery housing is advantageously provided which is firstly very stable, in particular even in the case of a crash or in the case of damage of the vehicle, in particular as a result of driving over obstacles, and secondly also has a low weight, as a result of which the overall weight of the vehicle is kept low and therefore the range which can be achieved is increased. A spacer may be provided at at least one point between the crossmember element and the cover plate and/or between the crossmember element and the bottom plate. The spacer means may be provided in one piece with the crossmember element. As a result, the stability of the housing is increased further in an advantageous way.

Advantageous refinements and developments of the invention can be gathered from the subclaims and the description with reference to the drawings.

It is provided in accordance with one embodiment of the present invention that the frame has first attaching points for attaching to a vehicle body, the frame having at least one flange, the first attaching points being provided, in particular, on the flange. As a result, a simple and stable attachment to the vehicle body is made possible in an advantageous way. Here, a fastening to the vehicle body can take place, in particular, via fastening means such as screws and/or rivets. Reinforcing elements, in particular metal sheets or rings, are provided at the first attaching points. A person skilled in the art understands that, if the fastening takes place via holes, said holes are, in particular, larger than the fastening means, in order therefore to make a tolerance compensation possible. Reinforcing elements are provided in the region of the first attaching points, the reinforcing elements preferably being diagonal plates and/or bulkhead plates which are arranged in the frame. Here, diagonal plates are, in particular, plates which are arranged diagonally in the cross section of the frame and with their main direction of extent parallel to the main direction of extent of the frame. Bulkhead plates are, in particular, plates which are arranged perpendicularly with respect to the main direction of extent of the frame in its profile. As a result, the rigidity and/or strength of the frame are/is advantageously increased further.

It is provided in accordance with a further embodiment that second attaching points for fastening a battery module are provided on the upper side and/or the underside of the crossmember element and/or on the bottom plate. Attaching elements which have a strength of at least 300 MPa are provided at the second attaching points. The attaching elements may have at least one elevation and/or depression such as a bead, for increasing the rigidity. In embodiments, the attaching points are formed from the crossmember, in particular in the form of lugs. As a result, it is advantageously made possible to provide a light and at the same time stable crossmember which is arranged directly or indirectly via spacer means on the cover plate and/or the bottom plate, and via which battery modules can be fastened.

In accordance with one embodiment, the cover plate is connected releasably to the frame. As a result, it is made possible in an advantageous way to remove the cover plate, for example for maintenance work. At least one seal is arranged in a circumferential manner, between the frame and the cover plate. As a result, a watertight housing is provided, in particular in the case of a removable cover plate.

It is provided in accordance with a further embodiment that the housing is of substantially cuboid configuration. As a result, a simple and modular construction of the housing is advantageously possible.

It is provided in accordance with a further embodiment that the frame is configured in multiple pieces, the frame preferably being manufactured from at least two, in particular symmetrical, frame parts. The frame parts are may be connected to one another in a positively locking, non-positive and/or integrally joined manner, and in embodiments, may be welded. The welded seams may be removed, in particular ground down, at least on the upper side and/or the underside of the frame. As a result, a sealed and unproblematic attachment to the cover plate is made possible. Here, the seal may be placed, adhesively bonded, extruded and/or injection molded onto the frame.

It is provided in accordance with a further embodiment that the crossmember element comprises, at least partially on the inside, a reinforcement, in particular by way of a polymer and/or metal foam and/or by way of a sheet metal part in the form of a closed hollow profile, for example a tube, or an open profile, for example an L-profile, a cap-shaped profile and/or a corrugated sheet. As a result, it is advantageously possible to further improve the crash safety.

It is provided in accordance with a further embodiment that the housing comprises a liquid sensor, the liquid sensor being arranged, in particular, at a lowest point of the bottom plate. The housing may include an acceleration sensor. As an alternative or in addition, the housing is attached to a sensor system of the vehicle. As a result, it is advantageously possible to prevent an accident, for example by the electric supply being interrupted, and/or to detect an accident, in order, for example, for possible damage to be checked before further driving is permitted.

It is provided in accordance with a further embodiment that the housing comprises temperature control elements and/or electric connecting elements. Here, electric connecting elements are, in particular, electric cables and/or electric connector elements. The temperature control elements comprise, in particular, a heating and/or cooling means. The temperature control elements and/or electric connecting elements may be arranged between the cover plate and the crossmember element, in the crossmember element and/or between the bottom plate and the crossmember element. As a result, it is advantageously possible to integrate connectors and/or modules which are required for the operation of a battery into the housing and therefore to provide a particularly compact housing with a low installation space requirement.

A further subject matter of the present invention is a method for manufacturing a housing for a vehicle battery, a cover plate, a bottom plate, a frame and at least one crossmember element being provided in a first step, the bottom plate being arranged and fastened, in particular in a watertight manner, on the frame in a second step, the crossmember element being inserted into the space which is enclosed by the frame and being connected to the frame and/or the bottom plate in a third step, battery modules being inserted and fastened in intermediate spaces between the frame, the crossmember element and the bottom plate in a fourth step, and the cover plate being connected, in particular releasably, to the frame in a fifth step. As a result, it is advantageously possible to manufacture a housing for a vehicle battery in a simple and inexpensive way, the housing being stable, compact in terms of installation space, and capable of being manufactured inexpensively.

It is provided in accordance with a further embodiment that the frame is profiled or canted from a metal sheet as a rolled profile or canted part in a first part step of the first step. The frame may be profiled or canted as a C-profile.

It is provided in accordance with a further embodiment that the frame is manufactured from at least two frame parts, the frame parts being connected, e.g., welded, in a second part step of the first step, the welded seams preferably being removed, in particular ground down. The frame parts may be substantially symmetrical. As a result, a frame of simple construction is provided which is highly stable.

It is provided in accordance with a further embodiment that the frame and the bottom plate are connected by way of laser soldering, laser welding and/or laser hybrid welding. Further, the frame and the cover plate may be adhesively bonded and/or screwed together. The crossmember element may be connected to the frame by way of arc welding and/or laser hybrid welding. A seal which is, in particular, circumferential is arranged between the frame and the cover plate in the fifth step.

Further details, features and advantages of the invention result from the drawings, and from the following description of embodiments using the drawings. Here, the drawings illustrate merely exemplary embodiments of the invention which do not restrict the essential concept of the invention.

DETAILED DESCRIPTION OF THE INVENTION

In the different figures, identical parts are always provided with the same designations and will therefore as a rule also be named or mentioned only once.

Figure 1:
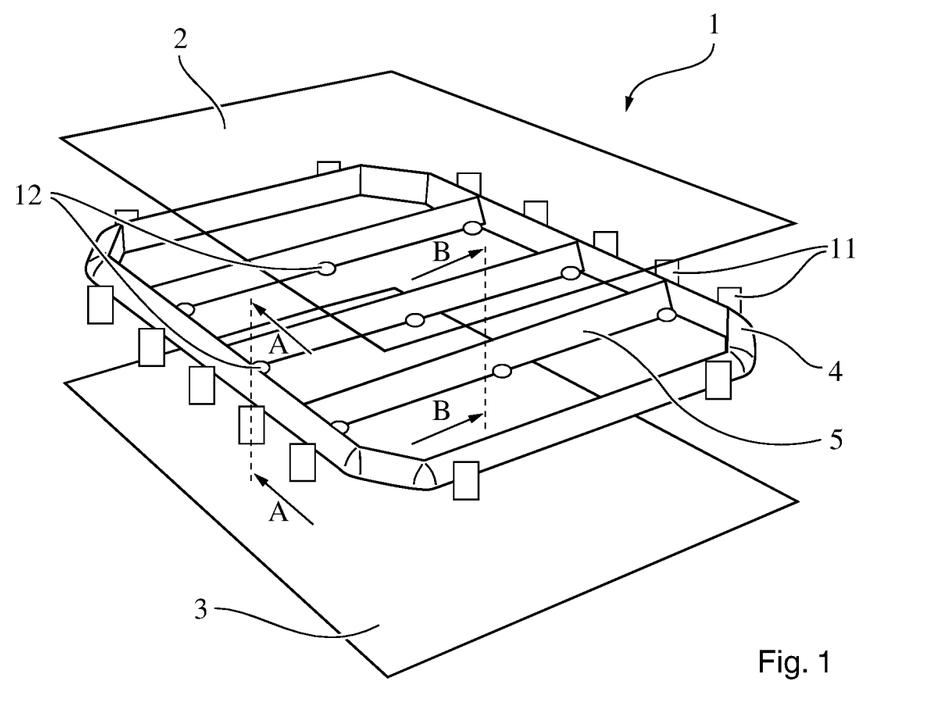
FIG. 1 shows a diagrammatic and perspective exploded view of a housing in accordance with one exemplary embodiment of the present invention.

FIG. 1 shows a diagrammatic and perspective exploded view of a housing 1 in accordance with one exemplary embodiment of the present invention. The housing is provided for a vehicle battery which is not shown here for the sake of clarity. The housing 1 comprises a bottom plate 3, a frame 4 which is connected fixedly to the former, three crossmember elements 5 in the embodiment which is shown, which crossmember elements 5 are connected fixedly to the frame 4 and are oriented parallel to the short sides of the frame 4, and a cover plate 2 which is connected releasably to the frame 4. For the sake of clarity, the elements are shown spaced apart here.

Furthermore, the housing 1 has first attaching points 11 for attaching to a vehicle body 20, and second attaching points 12 for fastening battery modules 21 in the housing 1. In the present case, furthermore, a sectional line A-A of the frame 4 and a sectional line B-B of a crossmember element 5 are illustrated.

The housing 1 is of substantially cuboid configuration, that is to say the cover plate 2 and the bottom plate 3 are of substantially rectangular configuration. The frame 4 is configured as a C-profile and is curved in each case at the corners here, as a result of which the stability is increased considerably. The first attaching points 11 are, for example, reinforced sections of the upper flange of the C-profile. The frame can be manufactured in one piece or in multiple pieces, for example consisting of two frame parts, and is preferably manufactured from relatively high strength steel with a strength of at least 400 MPa. Here, the crossmember elements are metal sheets made from relatively high strength steel, likewise with a strength of at least 400 MPa, and are configured as profiles with a rectangular or cap-shaped cross section.

Here, the bottom plate 3 is manufactured from ultra high strength manganese-boron alloyed steel with a strength of at least 780 MPa, and has beads for increasing the buckling resistance in the transverse direction, that is to say parallel to the shorter sides of the rectangle. The frame 4 is connected to the bottom plate 3 by means of laser soldering, laser welding and/or laser hybrid welding.

Here, the cover plate 2 is manufactured from a steel/plastic sandwich and likewise has beads in the transverse direction for increasing the buckling resistance. The cover plate 2 is, for example, screwed to the frame 4, a circumferential seal 6 being arranged between the frame 4 and the cover plate 2, the seal 6 being extruded, for example, onto the frame 4. A spacer means 10 is arranged at at least one point of the housing 1, preferably at least in the center, between the cover plate 2 and the crossmember element 5 which is arranged there, in order to ensure a sufficient stability of the housing 1.

Figure 2:
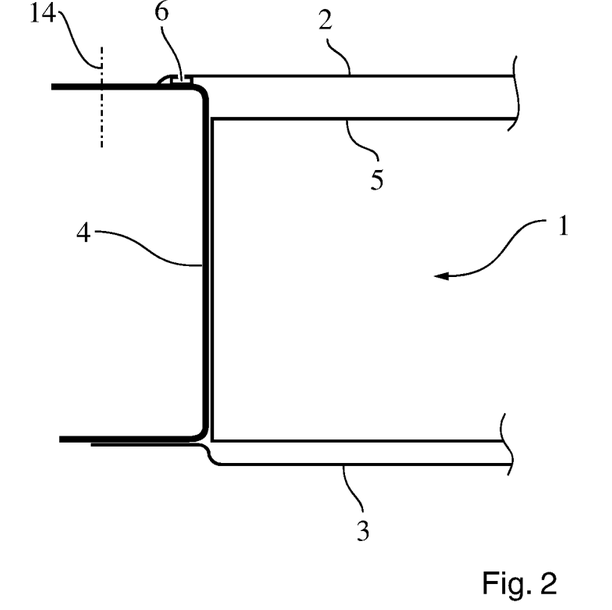
FIG. 2 shows a diagrammatic cross section along the sectional line A-A of the housing which is shown in FIG. 1 in accordance with one exemplary embodiment of the present invention.

FIG. 2 shows a diagrammatic cross section along the sectional line A-A of the housing 1 which is shown in FIG. 1, in accordance with one exemplary embodiment of the present invention. It can be seen clearly here that the frame 4 is configured as a C-profile. The frame 4 is connected releasably to the cover plate 2 by means of fastening means 14, screws here, a seal 6 being arranged in a circumferential manner between the cover plate 2 and the frame 4 in order to achieve a waterproof seal. In this way, the cover plate 2 can be removed, for example, for maintenance purposes and can subsequently be connected to the frame 4 again, the housing 1 being watertight before and afterward. The crossmember element 5 is fastened, for example welded, to the frame 4. The crossmember element 5 can lie directly on the bottom plate or can be spaced apart from the latter, as shown here, for example via spacer means 10.

Figure 3:
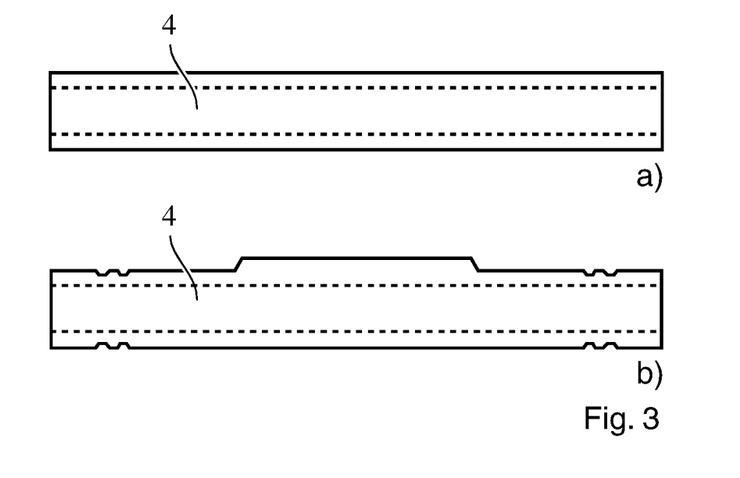
FIGS. 3a and 3b each show a frame in a diagrammatic detailed view in accordance with one exemplary embodiment of the present invention.

FIGS. 3a and 3b in each case show a frame 4 in a diagrammatic detailed view in accordance with one exemplary embodiment of the present invention. The two figures show the frame 4 in its starting state as a flat metal sheet, the dashed lines indicating where the metal sheet is profiled or canted. In FIG. 3a, the frame has a constant cross section, whereas, in FIG. 3b, it has a cross section which varies along its main direction of extent. In accordance with the embodiments which are shown, the frame 4 is configured in one piece, but can also be configured in multiple pieces. For example, the frame 4 in FIG. 3b can consist of two substantially symmetrical frame parts which are connected, preferably welded, to one another. Here, the welded seams are removed, for example ground down, at least at the points which are provided for the connection to the cover plate 2 and the bottom plate 3, in order to achieve planar sealing faces. As an alternative, the embodiments which are shown provide frame parts, of which a plurality are joined to one another, in order to manufacture the frame 4. The embodiment in accordance with FIG. 3b has an extended flange in the center, since first attaching points 11 for attaching the housing 1 to the vehicle body 20 are provided there. The notches on both sides of the central flange simplify the subsequent profile bending process, in order to manufacture the circumferential frame 4.

Figure 4:
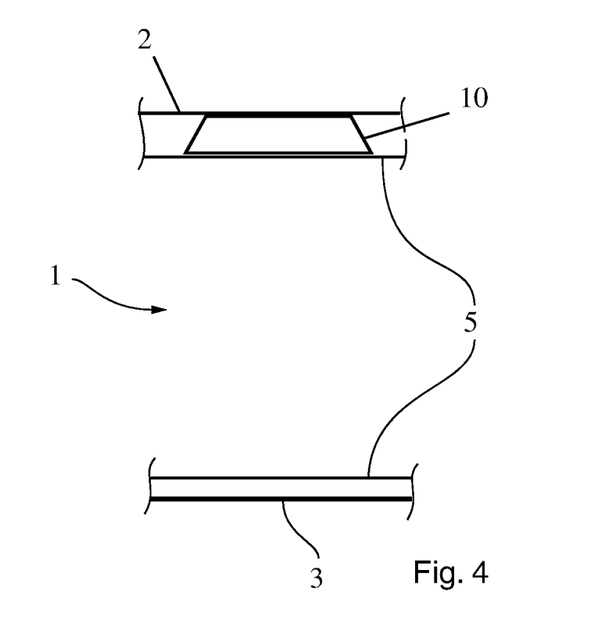
FIG. 4 shows a diagrammatic cross section of a housing in accordance with one exemplary embodiment of the present invention.

FIG. 4 shows a diagrammatic cross section of a housing 1 in accordance with one exemplary embodiment of the present invention. Here, a point can be seen, at which a spacer means 10 is arranged between the cover plate 2 and the crossmember element 5. In accordance with the embodiment which is shown, the bottom plate 3 and the crossmember element 5 are spaced apart from one another. Here, the spacer means 10 has a cap-shaped cross section and can be adhesively bonded, screwed and/or clipped to the cover plate 2 and/or the crossmember element 5.

Figure 5A:
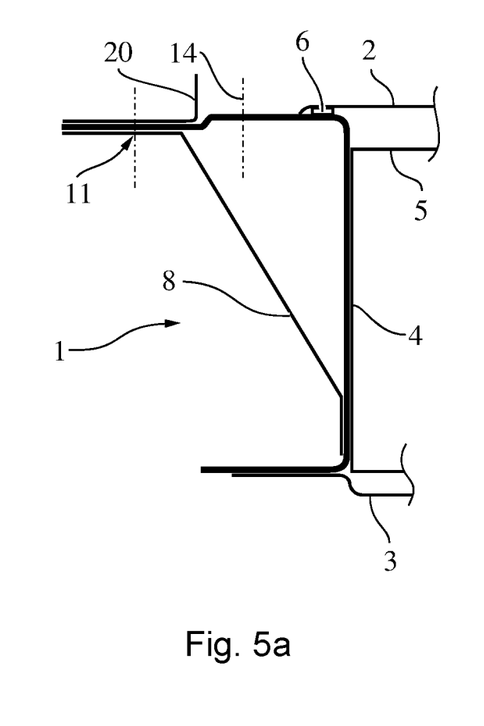
FIGS. 5a and 5b each show diagrammatic cross sections of a housing in accordance with exemplary embodiments of the present invention.
Figure 5B:
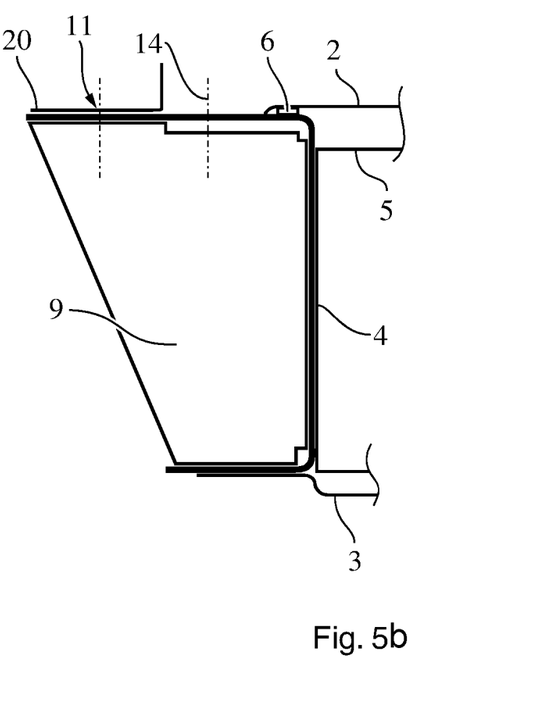

FIGS. 5a and 5b show diagrammatic cross sections of a housing 1 in accordance with exemplary embodiments of the invention. Here, the housing 1 is shown, in particular, in the region of first attaching points 11 for connecting the housing 1 to the vehicle body 20. Here, the housing 1 and the vehicle body 20 can be screwed together, for example. As can be seen clearly, the frame 4 has an extended flange at the first attaching point 11. In order to stabilize and increase the strength, reinforcing elements such as additional metal sheets or rings are arranged at the first attaching points 11. In addition, FIG. 5a shows a plate 8 which runs diagonally in cross section and dissipates the forces which act on the first attaching points 11. In FIG. 5b, a bulkhead plate 9 is provided for the same purpose with an extent in the plane of the drawing, that is to say perpendicularly with respect to the main extent of the frame 4. Here, the two embodiments can be provided as an alternative or in addition to one another. In the latter case, the points which are shown are provided, for example, offset along the frame, in order to make a dissipation of force possible which is as satisfactory as possible. A bulkhead plate 9 is preferably provided at each attaching point. For tolerance compensation, the diameters of the holes in the frame 4 may be at least 4 mm and at most about 10 mm greater than the screw diameter. As a result, a tolerance compensation of at least 2 mm and at most about 5 mm in each direction is made possible.

Figure 6:
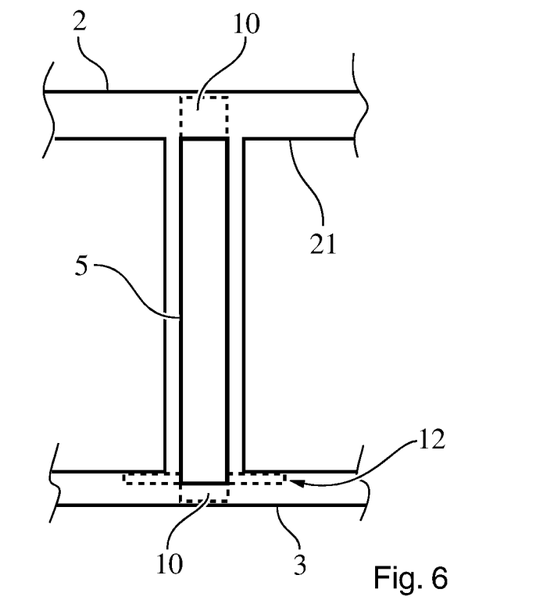
FIG. 6 shows a diagrammatic cross section along the sectional line B-B of a housing in accordance with one exemplary embodiment of the present invention.

FIG. 6 shows a diagrammatic cross section along the sectional line B-B of a housing 1 in accordance with one exemplary embodiment of the present invention. Here, in particular, a possible attachment of battery modules 21 in the housing 1 can be seen. Here, in each case one spacer means 10 is likewise arranged between the crossmember element 5 and the cover plate 2, and between the crossmember element 5 and the bottom plate 3. In addition, in order to configure second attaching points 12, attaching lugs are formed from the crossmember element 5, against which attaching lugs the battery modules 21 bear and to which they are connected. Here, a clearance is provided between the cover plate 2 and the battery module 21, in which clearance, for example, wiring of the battery modules 21 can be routed.

Figure 7:
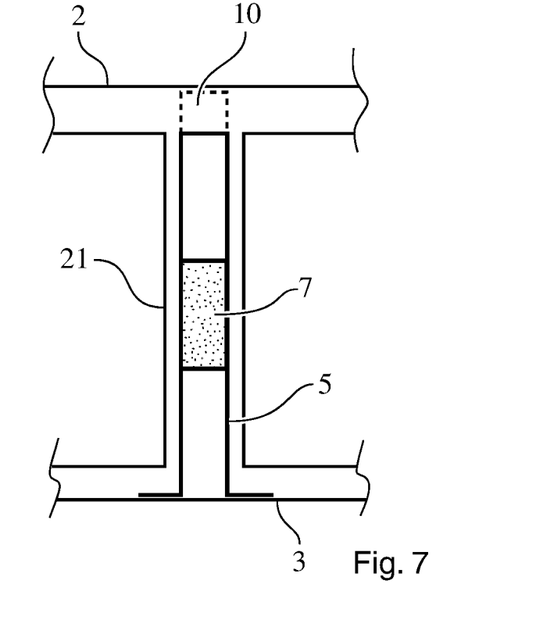
FIG. 7 shows a diagrammatic cross section along the sectional line B-B of a housing in accordance with one exemplary embodiment of the present invention.

FIG. 7 shows a diagrammatic cross section along the sectional line B-B of a housing 1 in accordance with one exemplary embodiment of the present invention. Here, a reinforcement 7, for example in the form of a polymer and/or metal foam, is provided on the inside in the crossmember element 5. As a result, forces which are caused by an accident can be absorbed in an improved manner. Furthermore, in the present case, the crossmember element 5 is configured as a cap profile and bears directly against the bottom plate 3, and is connected to the bottom plate 3 via the flanges of the crossmember element 5.

Figure 8:
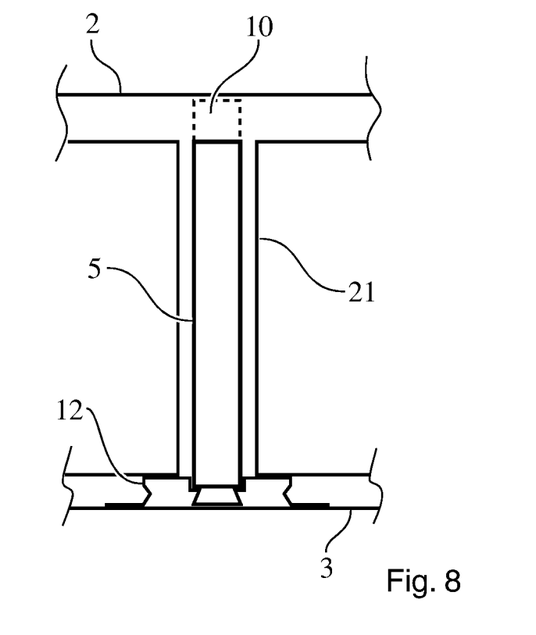
FIG. 8 shows a diagrammatic cross section along the sectional line B-B of a housing in accordance with one exemplary embodiment of the present invention.

FIG. 8 shows a diagrammatic cross section along the sectional line B-B of a housing 1 in accordance with one exemplary embodiment of the present invention. Here, the crossmember element 5 is mounted on the bottom plate 3 via a spacer means 10 which has beads laterally for the targeted deformation in the case of a crash. As a result, a region is provided, in which the spacer means 10 can deform in a targeted manner in the case of an accident and can therefore absorb energy without damage of the battery modules 21 occurring. During a repair, the cover plate 2 can then simply be removed and the deformed spacer means 10 can be replaced by new ones.

Figure 9:
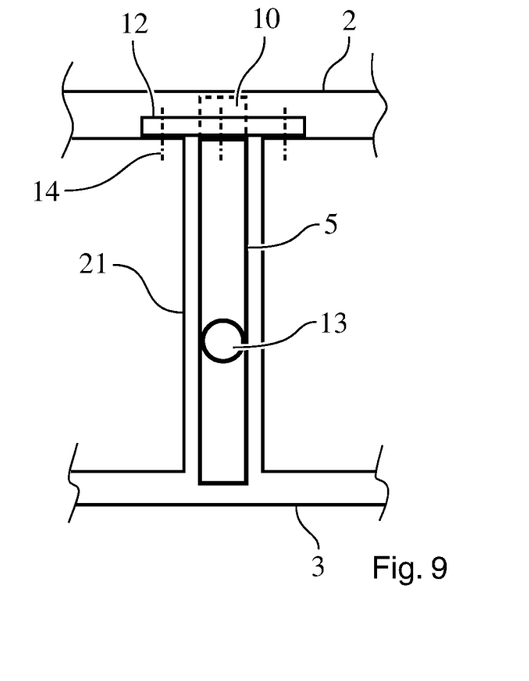
FIG. 9 shows a diagrammatic cross section along the sectional line B-B of a housing in accordance with one exemplary embodiment of the present invention.

FIG. 9 shows a diagrammatic cross section along the sectional line B-B of a housing 1 in accordance with one exemplary embodiment of the present invention. Here, a fastening element is provided above the crossmember element 5, on which fastening element the second attaching points 12 are provided. In addition, a tube is shown in the crossmember element 5, which tube acts as a temperature control element 13, for example for guiding through a cooling liquid and therefore for cooling the battery.

FIGS. 10a and 10b show cross sections of a spacer means 10 in accordance with exemplary embodiments of the invention. Here, the spacer means 10 correspond substantially to the embodiment which is shown in FIG. 8, for which reason reference is made to the explanations in this regard. Here, the spacer means 10 is configured as an extruded aluminum component in FIG. 10a and as an injection molded plastic component in FIG. 10b, and is approximately from 15 mm to 50 mm in depth if only one battery module is attached via the spacer means 10, and is approximately from 40 mm to 100 mm in depth if two battery modules are attached. The spacer means 10 therefore provide second attaching points 12 at the same time here. As has already been described above, the spacer means 10 can have, furthermore, beads as predetermined deformation points.

Figure 11:
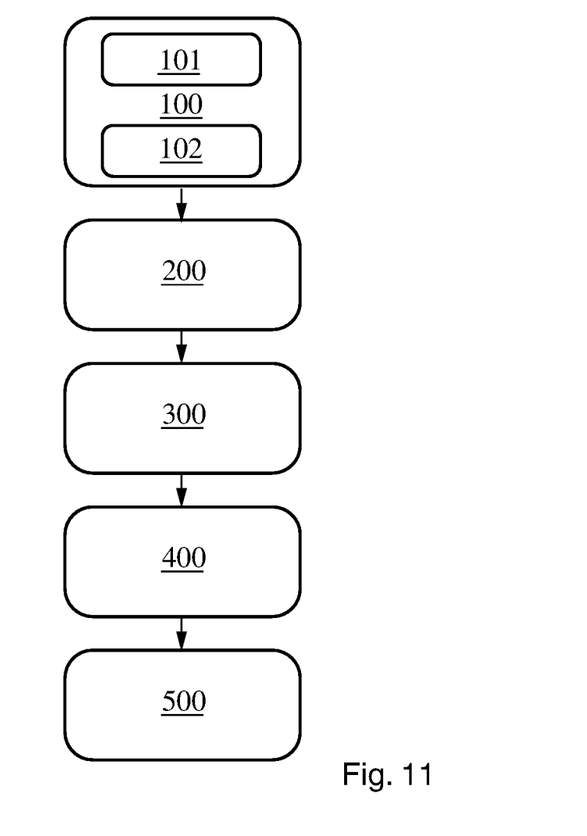
FIG. 11 shows a method in accordance with one exemplary embodiment of the present invention.

FIG. 11 shows a method in accordance with one exemplary embodiment of the present invention. Here, the elements of a housing 1 are provided in a first step 100. These are a cover plate 2, a bottom plate 3, at least one crossmember element 5 and a frame 4 which is in turn profiled or canted from a metal sheet, for example as a plurality of C-shaped rolled profiles or canted parts, in a first part step 101 of the first step 100. In a second part step 102 of the first step 100, the frame parts are connected, e.g., welded, to one another. Here, the welded seams are removed, for example ground down, in particular at the points which are provided for attaching to the further elements of the housing 1, in order to ensure planar sealing faces.

In a second step 200, the bottom plate 3 is arranged on the frame 4 and is connected to the latter, in particular in a watertight manner. In a third step 300, the at least one crossmember element 5 is inserted into the frame 4 and is connected to the latter and/or the bottom plate 3, for example via laser soldering and/or laser welding.

Figure 10:
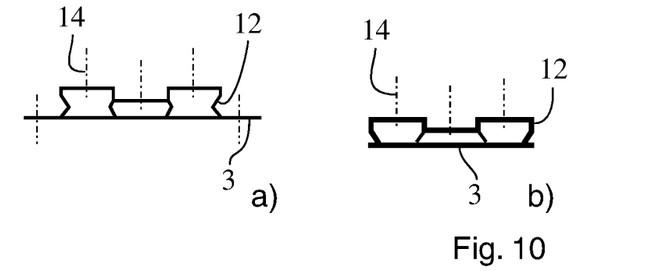
FIGS. 10a and 10b each show cross sections of a spacer means in accordance with exemplary embodiments of the present invention.

In a fourth step 400, battery modules 21 are inserted into intermediate spaces between the frame 4, the crossmember element 5 and the bottom plate 3, and are fastened directly or indirectly, for example via spacer means 10 as shown and described in FIGS. 8 and 10.

In a fifth step 500, the cover plate 2 is finally connected, for example screwed, to the frame 4, in particular releasably, a circumferential seal 6 preferably being arranged between the cover plate 2 and the frame 4.

The invention claimed is:

1. A housing for a vehicle battery, comprising:
   a cover plate,
   a bottom plate,
   a frame arranged between the cover plate and the bottom plate, the frame being connected to the cover plate and the bottom plate,
   at least one crossmember element arranged in a space defined by the frame,
   a spacer arranged along a length of the crossmember element and arranged between the cover plate and the crossmember element, and wherein:
the frame is configured as a rolled profile or canted part; and
the spacer comprises beads which allow a targeted deformation in case of an accident.

2. The housing as claimed in claim 1, wherein the frame has a first attaching point for attaching to a vehicle body, and at least one flange, and wherein the first attaching point is being provided on the flange.

3. The housing as claimed in claim 2, further comprising a second attaching point for fastening a battery module, wherein the second attaching point is provided on an upper side or an underside of the crossmember element or on the bottom plate.

4. The housing as claimed in claim 1, wherein the bottom plate is manufactured from a steel having a strength of at least 780 MPa.

5. The housing as claimed in claim 1, wherein at least one seal is arranged in a circumferential manner between the frame and the cover plate.

6. The housing as claimed in claim 1, wherein the crossmember element comprises a reinforcement, the reinforcement being fully inside the crossmember element.

7. The housing as claimed in claim 1, wherein the cover plate is configured as a sandwich comprising at least a metal portion and a plastic portion, and wherein the metal portion is manufactured from at least one of steel and aluminum.

8. A method for producing a housing for a vehicle battery, comprising:
providing a cover plate, a bottom plate, a frame and at least one crossmember element, wherein:
the frame is profiled or canted from a metal sheet as a rolled profile or canted part;
the crossmember element comprises a reinforcement, the reinforcement being fully within the crossmember element;
arranging the bottom plate on the frame and fastening the frame to the bottom plate, in particular in a watertight manner;
inserting the crossmember element into a space defined by the frame and connecting the crossmember element to the frame or the bottom plate;
inserting and fastening battery modules in an intermediate space between the frame, the crossmember element and the bottom plate;
releasably connecting the cover plate to the frame to form the housing; and
fastening a liquid sensor or an acceleration sensor to the housing.

9. The method as claimed in claim 8, wherein the frame is profiled or canted from a metal sheet as a rolled profile or canted part prior to the providing step.

10. The method as claimed in claim 9, wherein the frame is manufactured from at least two frame parts, the frame parts being connected after the frame is profiled or canted from the metal sheet and prior to the providing step.

11. The housing as claimed in claim 3, wherein the second attaching point is provided on the upper side and the underside of the crossmember element.

12. The housing as claimed in claim 11, wherein the second attaching point is further provided on the bottom plate.

13. The housing as claimed in claim 6, wherein the reinforcement is at least one of a polymer and a metal foam.

14. The housing as claimed in claim 6, wherein the reinforcement is a sheet metal part in the form of a closed hollow profile or an open profile.

15. The housing as claimed in claim 14, wherein the cover plate is configured as a sandwich comprising at least a metal portion and a plastic portion, wherein the metal portion is manufactured from at least one of steel and aluminum.

16. The method as claimed in claim 10, wherein the respective frame parts are welded thereby defining a weld seam.

17. The method as claimed in claim 16, wherein the weld seam is ground down.

18. The method as claimed in claim 17, further comprising:
arranging a seal in a circumferential manner between the frame and the cover plate.

19. The method as claimed in claim 8, further comprising providing a spacer along a length of the crossmember element, wherein the spacer comprises beads which allow a targeted deformation in case of an accident.

20. The housing as claimed in claim 1, further comprising a liquid sensor or an acceleration sensor.

* * * * *